United States Patent

Himmler

[11] 3,969,933
[45] July 20, 1976

[54] SPRING JOINT FOR MEASURING DEVICE
[75] Inventor: Gunther Himmler, Darmstadt, Germany
[73] Assignee: Gebr. Hofmann KG, Darmstadt, Germany
[22] Filed: Oct. 21, 1974
[21] Appl. No.: 516,813

[30] Foreign Application Priority Data
Dec. 18, 1973 Germany............................ 7344802

[52] U.S. Cl.................................. 73/133 R; 64/13; 73/146
[51] Int. Cl.².......................... G01L 5/16; G01L 5/20
[58] Field of Search........... 73/133 R, 146; 64/15 R, 64/15 B, 13

[56] References Cited
UNITED STATES PATENTS

| | | |
|---|---|---|
| 3,590,633 | 7/1971 | Fuhrmann et al. .................... 73/146 |
| 3,605,441 | 9/1971 | Hagemeister ........................... 64/13 |
| 3,780,573 | 12/1973 | Reus ..................................... 73/146 |

Primary Examiner—Charles A. Ruehl
Attorney, Agent, or Firm—Cushman, Darby & Cushman

[57] ABSTRACT

A joint for connecting a drive unit to a measuring arrangement connected to a wheel. The measuring arrangement comprising a wheel shaft rotatably supported by a measuring hub having deformable beams for measuring moments and forces acting on the wheel and the joint comprising a diaphragm flexible in the axial direction but rigid in the peripheral direction connected between the wheel shaft and one end of a cylindrical tube which is radially resilient and axially rigid, the other end of the tube being coupled to the drive unit.

2 Claims, 1 Drawing Figure

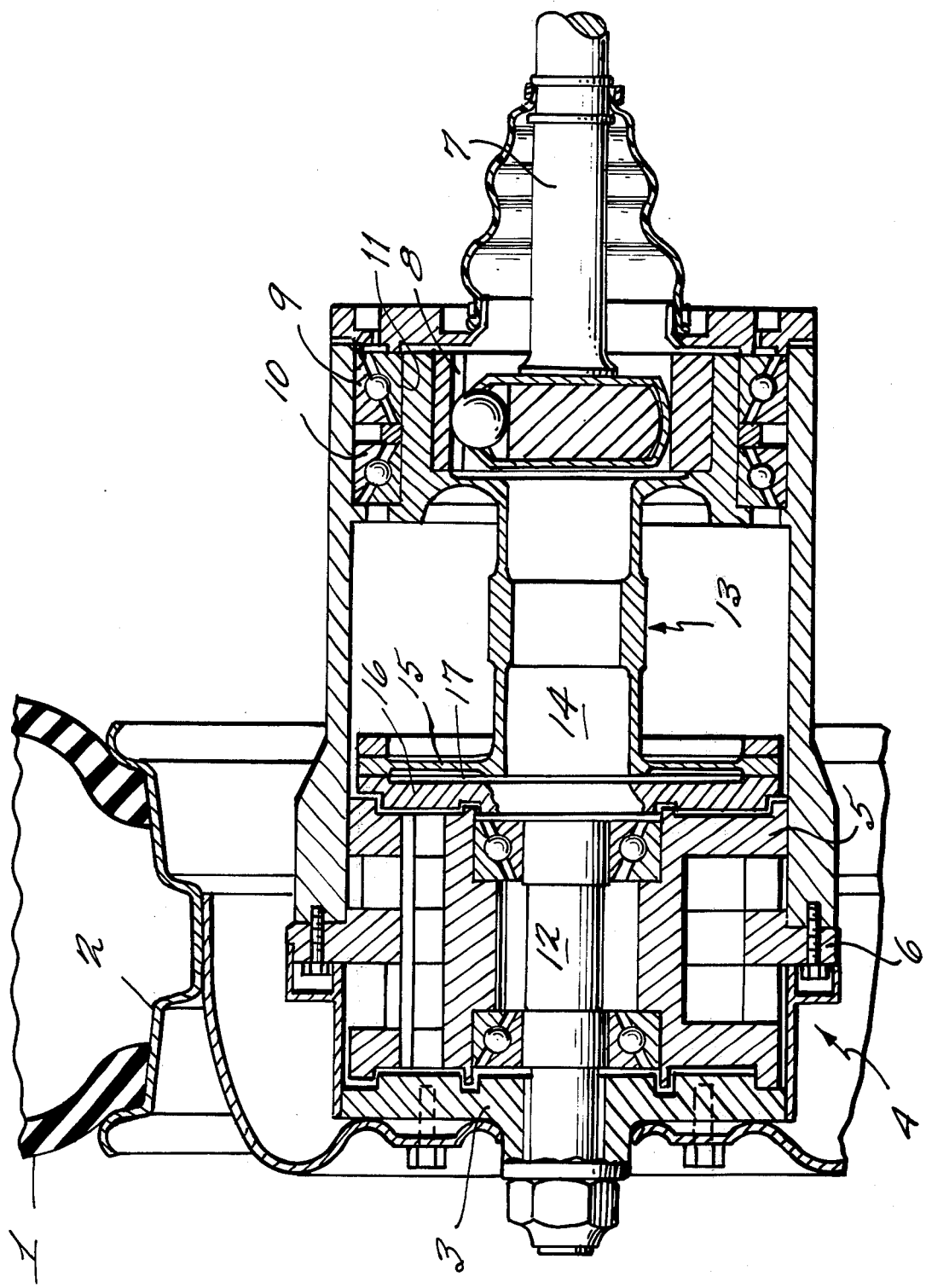

SPRING JOINT FOR MEASURING DEVICE

This invention relates to a homo-kinetic joint arranged between a measuring arrangement comprising a hub having resiliently deformable measuring beams and a drive unit to measure forces and moments acting on a rotating or still wheel and to transmit them to a measuring circuit for analysis.

A wheel subject to dynamic loads is axially and/or radially deflected so that, in case of a rigid connection between the measuring hub and the drive unit, the drive unit would influence the measuring result of the measuring hub and thus make impossible the separation of forces and moments with respect to their cause.

Devices are known which use double cardan joints for the connection. This joint arrangement, however, becomes unnecessarily expensive. Furthermore, undesired friction occurs in the joint pins of the double cardan joint which affects measuring to an inadmissible extent without a possibility of determining the exact degree of this influence.

In order to avoid the aforesaid disadvantages it is proposed with this invention to provide a homo-kinetic joint arrangement between the measuring arrangement and the drive unit to allow axial and radial movements and movements in a bending angle and therefore only minor and absolutely determinable forces and moments of the driving member on the measuring hub so that the measured values of the wheel can be determined and analyzed without errors introduced by the driving unit.

According to the present invention, this is achieved by providing a diaphragm flexible in the axial direction but rigid in peripheral direction at one end of a cylindrical tube functioning as a bar spring. This spring, while axially rigid, is radially resilient. The outer circumference of the diaphgragm is connected with the wheel shaft and the other end of the cylindrical tube with the drive shaft of the driving member.

This arrangement does not transmit to the measuring arrangement effects which originate in the driving member so that no disturbing influences which impair the measuring accuracy are perceptible at the beams.

The present invention will now be described by way of example with reference to the accompanying drawing in which:

The drawing shows a diagrammatic sectional view of the system according to the invention.

The tire 1 mounted on a rim 2 is attached to a wheel support 3 of a measuring arrangement 4. The measuring arrangement 4 comprises preferably a measuring hub with a layout and performance as exactly known from U.S. Pat. No. 3,867,838 for instance. The measuring hub comprises two beam crosses of four beams 5 each displaced in an axial direction, particularly for determination of the wheel load P and the peripheral force U and four axially arranged beams 6 which are especially provided for determination of the lateral force S. By the interconnection of the strain gauges applied to the beams mounted, details of which shall not be discussed here, the camber moment $M_S$ and restoring moment $M_R$ can also be measured.

The drive is effected from a shaft 7 through a known synchronizing displacement joint 8 which has an outer ring 11 supported by means of two bearings 9 and 10.

The driving member with the drive shaft 7 is coupled with the wheel shaft 12 of the measuring arrangement 4 by means of the homo-kinetic joint 13 according to the present invention. The homo-kinetic joint is directly connected on one side with the outer ring of the synchronizing displacement joint 8. The cylindrical tube 14 because of its special configuration functions as bar spring to enable radial excursions. The other side of the cylindrical tube 14 terminates in a diaphragm 15 which while axially flexible is rigid in the peripheral direction. The outer edge of the diaphragm 15 is fixed to a flange 16 of the wheel shaft 12 by known means. Recess 17 in flange 16 allows axial movements between wheel shaft 12 and drive shaft 7.

Forces and moments acting from the drive side on the measuring side in spite of elastic members 14 and 15 can be accurately measured as spring restoring forces which are exactly defined in contrast to frictional forces. Also deformations of the measuring hub beams which are transmitted to the homo-kinetic joint 13 and generate there forces of reaction, are determined and considered in the measurement results.

What is claimed is:

1. A homo-kinetic joint interconnecting a measuring arrangement and a drive unit, said measuring arrangement comprising a wheel shaft rotatably supported by a measuring hub that measures forces and moments acting on a wheel connected to said measuring arrangement, said joint comprising a diaphragm connected to said wheel shaft and flexible in the axial direction but rigid in a peripheral direction and a cylindrical tube coupled at one end to said diaphragm and connected at the other end to said drive unit, said tube functioning as a bar spring which, while axially rigid, is radially resilient.

2. A joint according to claim 1 wherein said drive unit comprises a synchronizing displacement joint and said other end of the cylindrical tube is connected thereto and the outer edge of the diaphragm is fixed to a flange of said wheel shaft.

* * * * *